United States Patent

DeGroot et al.

[15] 3,647,192
[45] Mar. 7, 1972

[54] GAS-LIQUID CONTACTING TRAY

[72] Inventors: Johannes H. DeGroot; Hendrik J. Scheffer; Willem H. Smit, all of Amsterdam, Netherlands

[73] Assignee: Shell Oil Company, New York, N.Y.

[22] Filed: Mar. 5, 1970

[21] Appl. No.: 16,798

[30] Foreign Application Priority Data

Mar. 31, 1969 Netherlands..............................16620

[52] U.S. Cl. .......................................................261/114 R
[51] Int. Cl. ..........................................................B01d 3/16
[58] Field of Search.........261/114 R, 114 A, 114 JP, 114 VT

[56] References Cited

UNITED STATES PATENTS

| 2,737,377 | 3/1956 | Huggins et al. | 261/114 JP |
|---|---|---|---|
| 2,752,139 | 6/1956 | Huggins | 261/114 |
| 2,759,720 | 8/1956 | Kittel | 261/114 |
| 2,832,578 | 4/1958 | Gilmore | 261/114 JP |
| 3,045,989 | 7/1962 | Kittel | 261/114 |
| 3,105,105 | 9/1963 | Kittel | 261/114 |
| 3,156,746 | 11/1964 | Kittel | 261/114 |
| 3,338,566 | 8/1967 | Kittel | 261/114 JP |
| 3,467,365 | 9/1969 | Webster | 261/114 |

Primary Examiner—Tim R. Miles
Assistant Examiner—Steven H. Markowitz
Attorney—Louis J. Bovasso and M. H. McCarthy

[57] ABSTRACT

A tray for contacting liquids and gases comprising a gas-liquid contacting section having a plurality of apertures for the passage of gas therethrough. At least one liquid supply inlet and at least one liquid discharge outlet is provided, the outlets being separated from the contacting section by a baffle plate disposed on the tray. A plate is disposed above the tray over the contacting sections thereof at a distance from the tray ranging between about one-half of the height of the baffle plate and twice that height, the plate being provided with passage means whose walls are positioned obliquely in such a way that, to the mixture of gas and liquid flowing through those passages in the upward direction, a deflection may be imparted in the direction of the nearest liquid supply outlet.

6 Claims, 7 Drawing Figures

PATENTED MAR 7 1972　　　　　　　　　　　　　　　　　3,647,192

INVENTORS:
JOHANNES H. DE GROOT
HENDRIK J. SCHEFFER
WILLEM H. SMIT
BY: *Louis J. Bovasso*

THEIR ATTORNEY

GAS-LIQUID CONTACTING TRAY

BACKGROUND OF THE INVENTION

1. Field of the Invention

The invention relates to a tray for contacting liquids and gases which is equipped with a contacting section where a number of apertures are provided for the passage of gas, one or more liquid supply devices and one or more liquid discharge devices, which discharge devices are each separated from the contacting section by means of a baffle plate placed on the tray.

2. Description of the Prior Art

The term gas is taken throughout this specification also to include vapor.

These trays are frequently used in columns for the exchange of matter and/or heat—in countercurrent—between a gas phase and one or more liquid phases, as employed, for example, for the distillation of liquid mixtures or for absorption and desorption processes.

For these processes it is necessary that there should be an intensive contact between the liquid phase and the gas phase. This is realized by distributing the gas via the openings provided in the tray throughout the liquid present on the tray. On the tray, a gas/liquid bed is then formed, in which contacting takes place. It is of importance that the liquid holdup of this bed should be as large as possible, because under these conditions the area of the surface of contact also is largest.

In contacting processes in which the volume ratio of liquid and gas is low, as for instance in distillation under reduced pressure, the supply of liquid to the tray is relatively small. This often leads to the holdup of the tray being small. As a result, the area of the surface of contact is likewise small and the tray efficiency is low. Moreover, the gas flow ascending through the tray openings is decelerated only a little, so that drops of liquid are readily carried along to the next higher tray, as a result of which only a low capacity can be reached; this also has an unfavorable influence on the efficiency of the tray.

SUMMARY OF THE INVENTION

It is an object of the invention to provide means by which the holdup of a tray can be increased considerably and a higher efficiency and capacity can be reached.

The invention therefore relates to a tray above which over the contacting section thereof at a distance from the tray ranging between one-half of the height of the baffle plate and twice that height, there is a plate which is provided with passages whose bounding walls are positioned obliquely in such a way that, to the mixture of gas and droplets of liquid flowing through those passages in the upward direction, a deflection may be imparted in the direction of the nearest liquid supply device.

The passages may, for instance, consist of round, square or slit-shaped apertures provided in the plate in such a way that they have an oblique position, the centerline of those apertures thus being at an angle with respect to a line perpendicular to the plate. The passages may also have been obtained by providing apertures or incisions in a flat plate and subsequently bending the material between the apertures or the incisions with respect to the plane of the plate. The plate may also be built up from a number of strips which are positioned so as to be oblique in the direction of the smaller dimension.

By providing for the plate to be present only over the contacting section of the tray, it is ensured that each liquid discharge device communicates with the entire space between that plate and the next higher tray, so that an unobstructed supply of liquid from that entire space can take place.

By choosing the distance between the tray and the plate over the tray so as to range between one-half of the height of the baffle plate present in front of the liquid discharge devices and twice that height it is ensured that, on the one hand, liquid particles ascending along with the gas may coalesce on the material of the plate before they reach the next higher tray and, on the other hand, that between plate and tray there remains a space that is sufficiently large to allow the formation of a gas/liquid bed with a large liquid holdup.

The mere coalescing effect of the plate may be expected to have a favorable influence on the holdup of the tray; however, a considerably stronger effect is obtained when, in the process of passing the plate, the liquid is transported in the direction of the liquid supply device. For, as a result of this, the residence time of the liquid on the tray is increased, which increase is accompanied by a proportional increase of the holdup.

It is of great importance that in this way a large holdup of the tray can be obtained by means of a plate wherein the total area of the passages is large and which, therefore, has a slight resistance to flow.

Preferably, the total cross-sectional area of the passages in the plate is so large that the resistance of the plate to gas flow is, at most, 20 percent of that of the contacting section of the tray.

This may be of great importance particularly in distillation processes carried out under reduced pressure when in a column the pressure drop per theoretical tray must not exceed a certain value.

Furthermore, it is desirable that, viewed in the axial direction, the smallest horizontal dimension of the passages is at most 20 mm. In that case, there always is sufficient contact between the gas and the plate so that it is unlikely that gas jets of some magnitude loaded with droplets of liquid will pass the plate unimpeded and transport liquid to the next higher tray.

In a suitable embodiment the plate consists of expanded metal. This material may have oblique, diamond-shaped passages in a staggered arrangement. Of these passages, the size, the mutual distance and the position may be varied in a wide range.

The transport of liquid by the plate is cumulative in the direction in which that transport takes place. As a result, in the proximity of a liquid supply device, an accumulation of liquid may occur when the distance to the nearest liquid discharge device is great. In that case, it is favorable when the position and/or the bounding walls of the passages through the plate are chosen so that the deflection in the direction of the nearest liquid supply device imparted to the mixture of gas and droplets of liquid is less strong according as the distance from the liquid supply device and the liquid discharge device between which the passages are present is greater. This may, for instance be realized by providing for the passages in the plate to have a less oblique position or by changing the position of those passages in such a way that the deflection in the direction of the nearest liquid supply device imparted to the droplets of the liquid over the surface of the tray is promoted and the space above the tray is utilized for the exchange process as completely as possible.

In many cases, it may also be advantageous if provision is made for the position and/or the bounding walls of the passages through the plate to differ in such a way that the deflection in the direction of the nearest liquid supply device imparted to the mixture of gas and droplets of liquid is less strong according as those passages are closer to that liquid supply device. This measure, too, promotes an even distribution of the liquid, because the deflection in the direction of the liquid supply imparted to the droplets of liquid is greatest in places near a liquid discharge device.

DESCRIPTION OF THE PREFERRED EMBODIMENT

Figure 1:
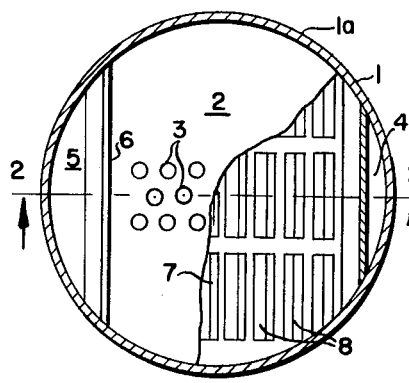
FIG. 1 is a top plan view of a tray provided with a plate with rectangular oblique passages in accordance with the teachings of our invention.
Figure 2:
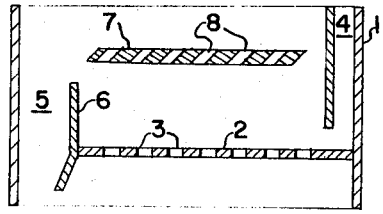
FIG. 2 is a cross-sectional view of the tray of FIG. 1.

Referring now to the drawing, FIGS. 1 and 2 show a wall 1 of a column 1a in which trays 2 are placed. The trays 2 are provided with perforations 3 for the gas, a liquid supply device 4 and a liquid discharge device 5. Between the liquid discharge 5 and the perforated part of the trays 2 there is a baffle plate 6, all as is well known in the gas-liquid contacting art.

In FIGS. 1 and 2, a plate 7 is disposed above tray 2 having rectangular passages 8 therein. The distance from the plate 7 to the tray 2 is equal to about 1.5 times the height of the baffle plate 6. Obviously, the plate 2 may be fixed to column 1a in any convenient manner.

Figure 3:
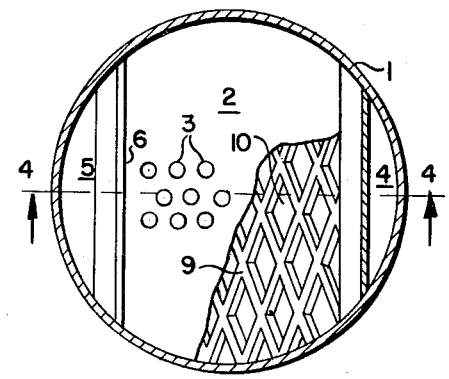
FIG. 3 is a top plan view of a second tray having a plate of expanded metal in accordance with the teachings of our invention.
Figure 4:
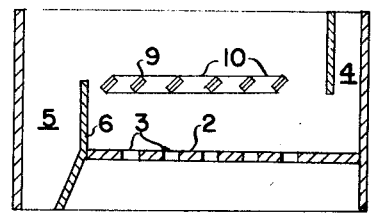
FIG. 4 is a cross-sectional view of the tray of FIG. 3.

In the embodiment of FIGS. 3 and 4, a plate 9 is disposed above tray 2 and level with the top of baffle plate 6 consisting of expanded metal with diamond-shaped passages 10.

Figure 5:
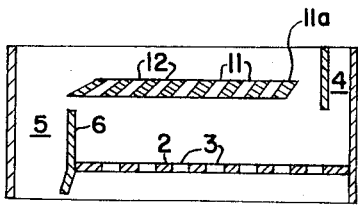
FIG. 5 is a cross-sectional view of still another plate having passages which differ in directional position.

In the embodiment of FIG. 5, a plate 11a is provided above tray 2, of the passages 11 of which near the liquid supply device 4 are in a less oblique position than the passages 12 near the liquid discharge device 5.

EXAMPLE

In a column with trays as shown in FIGS. 3 and 4, a distillation was carried out with a mixture of ethylbenzene and ortho-xylene, with total reflux, at a pressure of 100 mm. mercury column. The column, whose diameter was 45 cm., contained four trays with a mutual distance of 50 cm. Each tray was provided with apertures for the passage of gas with a diameter of 1.2 cm., the total cross-sectional area of the apertures amounting to 12 percent of the surface area of the tray. Furthermore, on each tray there was a liquid discharge device of which the cross-sectional area amounted to 4 percent of the surface area of the tray and which was separated from the contacting section by a 10 cm. high baffle plate. Over the contacting section a plate of expanded metal was provided. The thickness of the material from which this expanded metal had been made was 0.1 cm. Of the diamond-shaped passages, the larger horizontal dimentsion was 2.2 cm., the smaller 0.7 cm. The width of the material between the passages was 0.25 cm. The total cross-sectional area of the passages amounted to 80 percent of the surface area of the plate.

Figure 6:
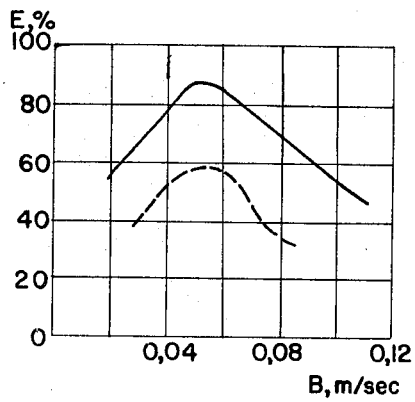
FIG. 6 and 7 are graphical illustrations in accordance with the teachings of our invention.
Figure 7:
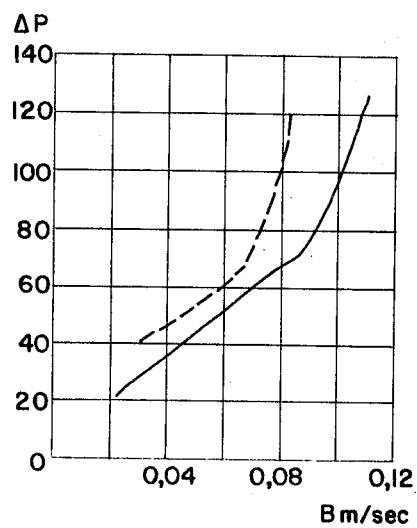

In FIGS. 6 and 7 are represented the results obtained with trays without a plate (dotted line) and with a plate at a distance of 10 cm. above the tray (full line). In FIGS. 6 and 7, the load factor B is plotted along of horizontal axis.

In FIG. 6, the average efficiency E of the trays is plotted on the vertical axis; owing to the application of the plate the value of E increased at low loads by about 50 percent, at high loads by about 100 percent. The maximum attainable load increased by 34 percent, from 0.082 m./sec. to 0.110 m./sec.

In FIG. 7, the pressure drop is plotted on the vertical axis in mm water column per theoretical tray, $\Delta P$. As a result of the larger holdup, this pressure drop decreased considerably when the plate was employed.

We claim as our invention:

1. A tray for contacting liquids and gases comprising:
   a gas-liquid contacting section having a plurality of apertures for the passage of gas;
   at least one liquid supply inlet and at least one liquid discharge outlet operatively engaging said tray, the discharge outlets being separated from the contacting section by a baffle plate disposed on the tray; and
   a plate disposed above said tray over the contacting section thereof at a distance from the tray ranging between about one-half of the height of the baffle plate and twice that height, said plate being provided with passage means whose walls are positioned obliquely in such a way that, to the mixture of gas and liquid flowing through those passages in the upward direction, a deflection may be imparted in the direction of the nearest liquid supply outlet.

2. The tray of claim 1 wherein the total cross-sectional area of the passage means in the plate is large enough that the resistance of the plate to gas flow is at most 20 percent of that of the contacting section of the tray.

3. The tray of claim 1 wherein the smallest horizontal dimension of the passages is at most 20 millimeters viewed in the axial direction thereof.

4. The tray of claim 1 wherein the plate consists of an expanded metal.

5. The tray of claim 1 wherein the deflection of the walls of the passage means in the direction of the nearest liquid supply device imparted to the mixture of gas and liquid is less strong according as the distance from the liquid supply device and the liquid discharge device between which the passages are present is greater.

6. The tray of claim 1 wherein the deflection through the passage means in the direction of the nearest liquid supply device imparted to the mixture of gas and liquid is less strong according as those passages are closer to that liquid supply device.

* * * * *